US006984607B2

(12) United States Patent
Kuperman et al.

(10) Patent No.: US 6,984,607 B2
(45) Date of Patent: Jan. 10, 2006

(54) METHOD OF PREPARING A CATALYST CONTAINING GOLD AND TITANIUM

(75) Inventors: Alex Kuperman, Midland, MI (US); Robert G. Bowman, Midland, MI (US); Howard W. Clark, Midland, MI (US); George E. Hartwell, Midland, MI (US); Garmt R. Meima, Terneuzen (NL)

(73) Assignee: Dow Global Technologies Inc., Midland, MI (US)

( * ) Notice: Subject to any disclaimer, the term of this patent is extended or adjusted under 35 U.S.C. 154(b) by 52 days.

(21) Appl. No.: 10/800,963

(22) Filed: Mar. 15, 2004

(65) Prior Publication Data

US 2004/0176620 A1  Sep. 9, 2004

Related U.S. Application Data

(63) Continuation of application No. 09/544,742, filed on Apr. 7, 2000.

(60) Provisional application No. 60/128,390, filed on Apr. 8, 1999.

(51) Int. Cl.
*B01J 23/52* (2006.01)
(52) U.S. Cl. .................. 502/344; 502/350; 502/439
(58) Field of Classification Search ............... 502/344, 502/350, 64, 340, 302, 300, 439
See application file for complete search history.

(56) References Cited

U.S. PATENT DOCUMENTS

| | | | |
|---|---|---|---|
| 3,959,316 A | 5/1976 | Piccinini et al. | 260/348.5 |
| 4,007,135 A | 2/1977 | Hayden et al. | 252/467 |
| 4,113,658 A | 9/1978 | Geus | 252/454 |
| 4,242,235 A | 12/1980 | Cognion et al. | 252/455 |
| 4,839,327 A | 6/1989 | Haruta et al. | 502/243 |
| 4,937,219 A | 6/1990 | Haruta et al. | 502/174 |
| 5,051,394 A | 9/1991 | Haruta et al. | 502/324 |
| 5,145,968 A | 9/1992 | Monnier et al. | 546/268 |
| 5,304,596 A | 4/1994 | Moriya et al. | 525/65 |
| 5,380,697 A | 1/1995 | Matusz et al. | 502/348 |
| 5,480,854 A | 1/1996 | Rajaram et al. | 502/304 |
| 5,502,020 A | 3/1996 | Iwakura et al. | 502/317 |
| 5,506,273 A | 4/1996 | Haruta et al. | 518/713 |
| 5,525,741 A | 6/1996 | Sugita et al. | 549/536 |
| 5,532,030 A | 7/1996 | Hirose et al. | 428/35.7 |
| 5,571,771 A | 11/1996 | Abel et al. | 502/330 |
| 5,700,753 A | 12/1997 | Wang et al. | 502/330 |
| 5,703,254 A | 12/1997 | Gaffney et al. | 549/536 |
| 5,965,754 A | 10/1999 | Clark et al. | 549/533 |
| 6,031,116 A | 2/2000 | Bowman et al. | 549/523 |
| 6,255,499 B1 | 7/2001 | Kuperman et al. | 549/523 |
| 6,323,351 B1 | 11/2001 | Bowman et al. | 549/536 |
| 6,646,142 B1 | 11/2003 | Meima et al. | 549/536 |
| 6,821,923 B1 * | 11/2004 | Kuperman et al. | 502/344 |

FOREIGN PATENT DOCUMENTS

| | | |
|---|---|---|
| EP | 0 482 817 A1 | 4/1992 |
| EP | 0 709 360 A1 | 5/1996 |
| EP | 0 723 810 A1 | 7/1996 |
| EP | 0 916 403 A2 | 5/1999 |
| JP | 3097623 | 4/1991 |
| JP | 0 016422 | 1/1994 |
| WO | 96/02323 | 2/1996 |
| WO | 97/25143 | 7/1997 |
| WO | 97/34692 | 9/1997 |
| WO | 97/34693 | 9/1997 |
| WO | 97/47386 | 12/1997 |
| WO | 98/00413 | 1/1998 |
| WO | 98/00414 | 1/1998 |
| WO | 98/00415 | 1/1998 |
| WO | 99/00188 | 1/1999 |
| WO | 99/52883 | 10/1999 |
| WO | 01/41926 | 6/2001 |
| WO | 03/011454 | 2/2003 |

OTHER PUBLICATIONS

"Activation and Regeneration of a Hydro-Oxidation Catalyst", filed in the United States Receiving Office on Sep. 30, 2002, U.S. Appl. No. 10/148,804; Applicants: Deborah H. Parker et al. (corresponds to WO 01/41926).
CRC Handbook of Chemistry & Physics, Robert C. Weast, Ed., 57$^{th}$ Edition, p. F210 (1976-1977), no month.
Dekkers, M.A.P. et al., "CO Adsorption and Oxidation on Au/TiO". Catalysis Letters, vol. 56, pp. 195-197 (1998), no month.
Derwent Abstract 1994-061881—Corresponds to JP-06 016422 (1994), no month.
Geus, J.W., "Preparation of Catalysts III", Studies in Surface Science and Catalysis, vol. 16, pp. 1, 6-8 (1983), no month.
"Method of Increasing the Lifetime of a Hydro-Oxidation Catalyst", filed in the US Receiving Office on Jan. 21, 2004, U.S. Appl. No. 10/484,328; Applicants: David G. Barton et al. (corresponds to WO 03/011454).

(Continued)

*Primary Examiner*—Edward M. Johnson
(74) *Attorney, Agent, or Firm*—Marie F. Zuckerman

(57) ABSTRACT

A process of preparing a catalyst comprising gold on a titanium-containing support. The method involves impregnating a support with a gold compound, a reducing agent, and optionally a promoter metal, wherein the reducing agent and/or the support contains titanium, and optionally heating the impregnated support. The catalyst is useful in the hydro-oxidation of olefins, such as propylene, with oxygen in the presence of hydrogen to olefin oxides, such as propylene oxide.

18 Claims, No Drawings

OTHER PUBLICATIONS

Linsen, B.G., "Physical and Chemical Aspects of Adsorbents and Catalysts"; Structure and Activity of Silica-Supported Nickel Catalysts, p. 501 (1970), no month.

Patent Abstracts of Japan, "Production of Titanium Oxide for Fixing Gold Superfine Grains", Corresponds to JP-3097623 (1991), no month.

"Process for the Direct Oxidation of Olefins to Olefin Oxides", filed in the United States on Dec. 11, 1998, U.S. Appl. No. 09/209,698; Applicant: Robert G. Bowman et al. (corresponds to WO/ 98/00414).

Sachtler, W.M.H. et al., "On the Mechanism of Ethylene Epoxidation", Cataly. Rev-Sci Eng., vol. 23 (1&2), pp. 127-149 (1981), no month.

Satterfield, Charles N., Heterogeneous Catalysis in Practice, McGraw-Hill Book Company, pp. 70-72, 82-83 (1980), no month.

Yen-Shuo Su et al., "XPS and DRS of Au/$TiO_2$ Catalysts: Effect of Pretreatment:", Catalysis Letters, vol. 57, pp. 49-53 (1999), no month.

* cited by examiner

METHOD OF PREPARING A CATALYST CONTAINING GOLD AND TITANIUM

CROSS REFERENCE TO RELATED APPLICATIONS

This application is a continuation application of U.S. Application Ser. No. 09/544,742, filed Apr. 7, 2000, which claims the benefit of U.S. Provisional Application Ser. No. 60/128,390, filed Apr. 8, 1999.

This invention was made with United States Government support under Award Number 70NANB5H1143 awarded by The National Institute of Standards and Technology.

BACKGROUND OF THE INVENTION

This invention pertains to a method of preparing an oxidation catalyst containing gold and titanium.

Catalysts containing gold and titanium are useful in the hydro-oxidation of olefins to olefin oxides. For example, it is known to oxidize propylene with oxygen in the presence of hydrogen and a catalyst containing gold and titanium to produce propylene oxide. Propylene oxide is a commercially important raw material for the production of propylene glycols and polyether polyols which are used in preparing polyurethanes.

The catalyst used in the aforementioned hydro-oxidation process more specifically comprises gold on a titanium-containing support. The support may be selected, for example, from titanosilicates, titanium dioxide, titanium dispersed on silica, and certain metal titanates. Optionally, the catalyst can further contain a promoter metal, such as an alkali, alkaline earth, or lanthanide rare earth metal, for the purpose of enhancing catalytic performance. Prior art representative of this process and catalyst composition includes PCT patent publications WO 98/00413, WO 98/00414, and WO 98/00415.

It is known to prepare a hydro-oxidation catalyst comprising a platinum group metal on a titano silicate support by impregnation methods. Art of this type, represented by PCT patent publication WO 96/02323, discloses impregnating a solution of a platinum group metal salt onto a titanosilicate support, and thereafter reducing the impregnated support under hydrogen to adjust the bond energy states of the platinum group metal. Reduction under hydrogen disadvantageously may require high temperatures, and the reduction cannot be controlled sufficiently well.

Other art, such as EP-A1-0,709,360, teaches catalysts comprising ultra-fine particles of gold deposited on titanium dioxide being prepared by a deposition precipitation method. This method involves preparing an aqueous solution of a soluble gold salt, adjusting the pH to between 7 and 11, and then adding titanium dioxide to the solution. The resulting composite is calcined to obtain ultra-fine elemental gold particles deposited on the titanium dioxide carrier.

An alternative, but related method, exemplified in U.S. Pat. No. 4,839,327 and EP-A1-0709,360, involves a coprecipitation method. Here, an aqueous gold solution with a pH value of between 7 and 11 is added dropwise to an aqueous solution of a soluble titanium salt adjusted to the same pH range, so as to form a coprecipitate. The coprecipitate is calcined to obtain metallic gold deposited on titanium dioxide.

In another deposition precipitation method, exemplified by U.S. Pat. No. 4,937,219, a catalyst comprising ultra-fine gold particles immobilized on a mixed alkaline earth-titanium oxide is prepared. The preparation involves dissolving or suspending an alkaline earth-titanium compound, such as strontium titanate, in an aqueous solution of a gold compound, adjusting the pH to between 7 and 11, and adding dropwise a reducing agent thereby causing ultra-fine gold particles to be precipitated onto the alkaline earth titanate. The reducing agent is disclosed to be formalin, hydrazine, or citrate salts. A variation of this method is found in U.S. Pat. No. 5,051,394, wherein the pH of an aqueous solution containing a gold compound and a water-soluble titanium salt is adjusted with an alkali compound to yield a coprecipitate, to which is added a carboxylic acid or salt thereof. The coprecipitate thus treated is heated to form the catalyst comprising metallic gold deposited on titanium oxide.

All of the aforementioned deposition precipitation and coprecipitation methods suffer from multiple disadvantages. Specifically, the methods of the prior art require the accurate control of deposition conditions over a long period of time. Moreover, when a reductant is used, the gold particles may be reduced in solution before adhering to the support, which results in an inefficient use of gold. Since there is poor control over the precise amount of gold which is deposited onto the support, additional efforts are required to recover unused gold from the deposition solution. Even more disadvantageously, the prior art methods are temperature sensitive. They also require the use of large quantities of solvents and control of pH. Finally, the prior art methods may result in poor adherence of the gold particles onto the support.

In view of the above, it would be desirable to discover a simple, efficient, and reproducible method of preparing an active oxidation catalyst comprising gold deposited on a titanium-containing support. It would be desirable if the process avoided the disadvantages of the deposition precipitation and coprecipitation techniques. It would be more desirable if the process could be adapted to practical forms of the catalyst, such as, pelleted and extruded titanium-containing supports. It would be even more desirable if the process did not require a gold recovery stage. Such a process would advantageously reduce catalyst preparation efforts and costs, and equally importantly, conserve gold.

SUMMARY OF THE INVENTION

This invention is a process of preparing a catalyst composition comprising gold on a titanium-containing support. The process comprises impregnating a gold compound and a reducing agent onto a catalyst support under conditions sufficient to prepare the catalyst composition. Optionally, the impregnated support may be heated prior to use. Since the catalyst of this invention comprises titanium, a source of titanium must be present in the process of preparing the catalyst. This requirement is fulfilled when the support and/or the reducing agent contains titanium. Accordingly, the words "a titanium-containing support," which are used to describe the catalyst, broadly embrace embodiments in which the support originally contained titanium, such as is found in titania, a titanosilicate, or a metal titanate; or alternatively, embodiments in which the titanium derived from the reducing agent has been dispersed onto a support which originally did not contain titanium, for example, titanium dispersed on silica; or alternatively, embodiments in which titanium derived from the reducing agent has been dispersed onto a support which originally contained titanium, such as, titanium dispersed on titania.

The invention described hereinabove beneficially provides a simple, efficient, and reproducible method of preparing an oxidation catalyst comprising gold deposited on a titanium-containing support. Advantageously, the method of the invention employs simple impregnation techniques, rather than the complex and time-consuming deposition precipitation and coprecipitation techniques of the prior art. Moreover, as compared with prior art methods, the method of this invention beneficially employs lesser amounts of solvents and does not require control of pH. Even more advantageously, the method of this invention provides better control over the amount of gold deposited onto the support. Since the method of this invention efficiently utilizes gold, it is not necessary to recover unused gold as is required in the prior art methods. As a further advantage, the method of the invention can be employed to prepare practical forms of the catalyst, namely, catalysts prepared with pelleted and extruded supports. Finally, in the method of this invention, reduction is simply accomplished by impregnating a reducing agent onto the support, as opposed to the prior art method of reducing under hydrogen. All of the aforementioned advantages provide a method of preparing the catalyst which is cost effective and more suitable for commercial purposes.

In another aspect, this invention is a catalyst composition comprising gold on a titanium-containing support. The catalyst is prepared by the aforementioned method comprising impregnating a gold compound and a reducing agent onto a catalyst support, wherein the reducing agent and/or the support comprise titanium, the impregnation being conducted under conditions sufficient to prepare the catalyst composition. Optionally, the catalyst may be heated prior to use.

As noted hereinbefore, the catalyst comprising gold on a titanium-containing support finds utility in the hydro-oxidation of olefins to olefin oxides. The term "hydro-oxidation" means that the olefin oxidation is conducted with oxygen in the presence of hydrogen to form the olefin oxide. Water is produced as a coproduct of this process, but water can also be produced by the direct combustion of hydrogen. When the gold-titanium catalyst is prepared by preferred methods of this invention, the catalyst beneficially produces lesser amounts of water in the hydro-oxidation process, as compared with catalysts of similar composition prepared by the prior art methods. Illustrative of the aforementioned oxidation process is the hydro-oxidation of propylene to propylene oxide using a catalyst comprising gold on a titanium-containing support. When the catalyst is prepared by the method of this invention, the catalyst advantageously produces propylene oxide in a selectivity of greater than about 80 mole percent at a propylene conversion of at least about 0.2 mole percent.

DETAILED DESCRIPTION OF THE INVENTION

The invention disclosed herein relates to a method of preparing a catalyst composition comprising gold on a titanium-containing support. The process comprises impregnating a gold compound and a reducing agent onto a catalyst support under conditions sufficient to prepare the catalyst composition. Since titanium is an essential element of the catalyst composition described herein, a source of titanium is required in the process of preparing the catalyst. Accordingly, the support can provide the titanium, as illustrated in a support comprising titanium dioxide. Alternatively, the reducing agent can provide the titanium, as illustrated in a reducing agent of an organotitanium compound, such as titanocene, or a titanium coordination compound, such as titanyl acetylacetonate. Alternatively, both the support and the reducing agent can provide the source of titanium. In an alternative embodiment, following the impregnation step, the catalyst is heated prior to use.

In a preferred embodiment of this invention, the process comprises impregnating a gold compound and a reducing agent which does not contain titanium onto a support which contains titanium under conditions sufficient to prepare the catalyst composition comprising gold on a titanium-containing support. Following the impregnation step, the catalyst may optionally be heated prior to use.

In another preferred embodiment of this invention, the process comprises impregnating a gold compound and a titanium-containing reducing agent onto a catalyst support which does not contain titanium under conditions sufficient to prepare the catalyst composition comprising gold on a titanium-containing support. The titanium-containing reducing agent is preferably selected from the group consisting of organotitanium compounds and titanium coordination compounds. Likewise, the catalyst may optionally be heated after the impregnation step and prior to use.

In a third preferred embodiment of this invention, the catalyst further comprises at least one promoter metal. Any metal or metal ion which enhances the productivity of the catalyst in the oxidation process can be employed as a promoter. Promoter metals are described more specifically hereinafter. In preparing the catalyst containing a promoter metal, the support is impregnated with the gold compound, at least one promoter metal compound, and the reducing agent under conditions sufficient to prepare the catalyst composition. As noted hereinbefore, either the reducing agent or the catalyst support, or both, contain titanium. Optionally, the catalyst may be heated after the impregnation and prior to use.

In yet another preferred embodiment, after the impregnation step(s) and prior to the optional heating step, the support is washed. If the washing removes desirable promoter metal ions, then in another preferred embodiment of the invention, the support can be treated with a solution of the promoter metal ions after the washing step and prior to the optional heating step to replenish the supply of promoter metal ions on the support.

As noted hereinbefore, the catalyst which is beneficially prepared by the process of this invention comprises gold and a titanium-containing support. Optionally, the catalyst may further comprise at least one promoter metal, which is preferably selected from the Group 1, Group 2, silver, lanthanide rare earths, and actinide metals of the Periodic Table, and mixtures thereof. The gold can exist in an oxidation state or states ranging from about +3 to about 0, as determined by X-ray photoelectron spectroscopy. It is believed that the reducing agent which is used in the process of this invention converts at least a portion of the gold from an oxidation state of about +3 to an oxidation state less than about +3. The gold can exist as ions or charged clusters, and/or as discrete gold particles, and/or as mixed gold-promoter metal particles, and/or as gold atoms or clusters of atoms dispersed over the surface of the support. Gold particles may or may not be seen by high resolution transmission electron microscopy (HR-TEM) and/or by Mie scattering. Preferably, the average gold particle size is less than about 500 Å, more preferably, less than about 200 Å, and most preferably, less than about 100 Å. The titanium typically exists in a positive oxidation state, as determined by X-ray photoelectron and X-ray absorption spectroscopies.

The gold loading on the titanium-containing support can be any loading, provided that the catalyst produced is active in the hydro-oxidation process described herein, wherein an olefin is oxidized with oxygen in the presence of hydrogen to an olefin oxide. Generally, the gold loading is greater than about 0.001 weight percent (10 parts per million), based on the total weight of the gold and support. Preferably, the gold loading is greater than about 0.005, and more preferably, greater than about 0.010 weight percent, based on the total weight of the gold and support. Generally, the gold loading is less than about 20 weight percent. Preferably, the gold loading is less than about 10.0, more preferably, less than about 5.0 weight percent.

Impregnation techniques are known in the art, such as for example, as described by Charles N. Satterfield in *Heterogeneous Catalysis in Practice*, McGraw-Hill Book Company, New York, 1980, pp. 82–84, incorporated herein by reference. In this procedure, the support is wetted with a solution containing a soluble compound of interest or a soluble compound of the ion of interest. In the present case, a solution containing a gold compound and a solution containing a reducing agent are employed. The impregnation may be conducted to the point of incipient wetness, or to a point of lesser wetness, or to a point of greater wetness with an excess of solution, as desired. Preferably, the impregnation is conducted to the point of incipient wetness or to a point of lesser wetness. The temperature of the deposition typically ranges from about ambient, taken as 21° C., to about 100° C., preferably, from about 21° C. to about 50° C. The deposition is conducted usually at ambient pressure. The support may be treated with multiple impregnations. More specific details of the impregnation method are described hereinafter.

Any gold compound which can be solubilized to form an impregnation solution can be suitably employed in the process of this invention. Aqueous and non-aqueous solvents can be used. Non-limiting examples of soluble gold compounds include chloroauric acid, sodium chloroaurate, potassium chloroaurate, gold cyanide, potassium gold cyanide, diethylamine auric acid trichloride, gold acetate, alkyl gold halides, preferably, the chloride, as well as alkali aurates, including lithium aurate, sodium aurate, potassium aurate, rubidium aurate, and cesium aurate. Preferably, the gold compound is chloroauric acid or an alkali salt thereof. Alkyl gold halides, preferably the chloride, are suitably employed with non-aqueous solvents. Typically, the molarity of the soluble gold compound in the impregnation solution ranges from about 0.001 M to the saturation point of the soluble gold compound, preferably, from about 0.005 M to about 1.0 M.

Any reducing agent which can be solubilized to form an impregnation solution can be suitably employed in the process of this invention. The reducing agent may be classified into two categories: those which do not contain titanium and those which contain titanium. In the former category, typically the reducing agent is an organic compound which is capable of being oxidized. Non-limiting examples of suitable organic reducing agents include carboxylic acids and salts thereof, alcohols and alkoxide salts thereof, sugars, alkanolamines, and alkylamines. Specific species illustrative, but not limiting, of these groups include acetic acid, lactic acid, citric acid, maleic acid, cinnamic acid, and alkali and alkaline earth acetates, lactates, citrates, maleates, and cinnamates, as well as alkali gluconates, glucose, methanol, ethanol, isopropanol, ethanolamine, and isopropylamine. Preferably, the reducing agent is selected from $C_{6-20}$ sugars, $C_{2-20}$ carboxylic acids, $C_{1-15}$ aliphatic alcohols, $C_{1-15}$ alkylamines, the alkali and alkaline earth salts of the aforementioned sugars, carboxylic acids, and alcohols, and mixtures of any of the aforementioned compounds. Most preferably, the reducing agent is selected from methanol, ethanol, isopropanol, ethanolamine, acetic acid, lactic acid, citric acid, maleic acid, cinnamic acid, sodium acetate, sodium lactate, sodium citrate, sodium maleate, sodium cinnamate, and mixtures thereof. Typically, the molarity of the organic reducing agent in the impregnation solution ranges from about 0.001 M to the saturation point of the reducing agent, preferably, from about 0.005 M to about 1.0 M. In an alternative embodiment of the invention, the solvent of the impregnation solution may also function as the reducing agent, as may be the case with alcohols, like methanol and ethanol.

The loading of the organic reducing agent on the support can vary broadly, so long as the catalyst produced is active in the hydro-oxidation process described herein. Generally, the molar ratio of organic reducing agent to gold is greater than about 0.5:1, preferably, greater than about 1:1. In some embodiments of the invention, the molar ratio of organic reducing agent to gold may be less than about 100:1, and preferably, less than about 20:1. In other embodiments of the invention, for example, when the reducing agent also functions as the impregnation solvent, the molar ratio of organic reducing agent to gold may be greater than about 10,000:1 and may even approach infinity, particularly when the gold concentration is low.

In the second category, the reducing agent itself contains titanium, more specifically, as an organotitanium compound or a titanium coordination compound. The term "organotitanium compound" is defined as a compound containing a titanium-carbon σ-bond or a titanium-carbon π-bond. A titanium-carbon σ-bond is found, for example, in alkyltitanium compounds, such as dimethyltitanium dichloride. A titanium-carbon π-bond is found, for example, in cyclopentadienyltitanium compounds and aryltitanium compounds, such as, titanocene. The term "titanium coordination compound" is defined as a compound containing a titanium atom or ion bonded to an organic molecule of either a neutral or anionic valence, such as, an alkylamine, alkoxylate, or carboxylate. Typically, the neutral or ionic organic molecule contains a donor pair of electrons. Any organotitanium compound or titanium coordination compound can be used in the method of this invention, so long as the organic component of the compound can be oxidized. Non-limiting examples of suitable titanium-containing reducing agents include titanium alkoxides, such as titanium isopropoxide, titanium propoxide, titanium ethoxide, titanium butoxide, and titanium glycolate; titanium carboxylates, such as, titanium oxalate, titanium lactate, titanium citrate, and titanyl acetylacetonate; and dicyclopentadienyl titanium halides, such as, dicyclopentadiene titanium dichloride, and other organotitanocene halides. Preferably, the organotitanium compound is selected from cyclopentadienyl titanium compounds and alkyltitanium compounds. Preferably, the titanium coordination compound is selected from titanium alkoxides and titanium carboxylates. Typically, the molarity of the titanium-containing reducing agent in the impregnation solution ranges from about 0.001 M to the saturation point of the organotitanium compound, preferably, from about 0.005 M to about 1.0 M.

The loading of the titanium-containing reducing agent onto the support can vary broadly, so long as the catalyst produced is active in the hydro-oxidation process described herein. Generally, the titanium-containing reducing agent is loaded onto the support up to the desired titanium loading. The titanium loading is generally greater than about 0.02 weight percent, preferably, greater than about 0.1 weight percent, and more preferably, greater than about 0.5 weight percent, based on the weight of the support. Generally, the titanium loading is less than about 20 weight percent, and preferably, less than about 10 weight percent, based on the weight of the support.

Suitable solvents for preparing the impregnation solutions broadly include inorganic and organic solvents, and mixtures thereof, in which the compound to be dissolved is soluble and stable. Generally, the solvent should be readily evaporated, since ultimately, the impregnation solvent is removed from the support. Non-limiting examples of suitable solvents include water, aliphatic alcohols and polyols, aliphatic and aromatic hydrocarbons, ketones, esters, ethers, and mixtures thereof. Water and alcohols are the preferred solvents for the gold compound and may also be preferred for the organic reducing agent. If water reacts with the organotitanium compound or the titanium coordination compound, however, then the compound is preferably solubilized in a non-reactive organic solvent. As noted hereinabove, solvents, such as alcohols, can also function as the reducing agent.

If the reducing agent does not contain titanium, then a titanium-containing support is required. The titanium-containing support may take a variety of forms including those described hereinafter.

a. Titanium Dioxide

Amorphous and crystalline titanium dioxide can be suitably employed as the titanium-containing support. The crystalline phases include anatase, rutile, and brookite. Included in this category are composites comprising titanium dioxide supported on metal oxides, such as silica and alumina.

b. Metal Titanates

Stoichiometric and non-stoichiometric compounds comprising metal titanates can also be suitably employed as the catalyst support. The metal titanates can be crystalline or amorphous. Preferably, the metal titanates are selected from promoter metal titanates, non-limiting examples of which include the titanates of Group 1, Group 2, and the lanthanide and actinide metals. More preferably, the promoter metal titanate is selected from the group consisting of magnesium titanate, calcium titanate, barium titanates, strontium titanate, sodium titanate, potassium titanate, and the titanates of erbium, lutetium, thorium, and uranium.

c. Titanosilicates

Crystalline and amorphous titanosilicates, preferably those that are porous, are also suitably employed as the support. Titanosilicates possess a framework structure formed from $SiO_4^{4-}$ wherein a portion of the silicon atoms is replaced by titanium. Within the framework structure of porous titanosilicates there exists a regular or irregular system of pores and/or channels. Empty cavities, referred to as "cages", can also be present. The pores can be isolated or interconnecting, and they can be one, two, or three dimensional. The pores are more preferably micropores or mesopores or some combination thereof. As used herein, a micropore has a pore diameter (or critical dimension as in the case of a non-circular perpendicular cross-section) ranging from about 4 Å to about 20 Å, while a mesopore has a pore diameter or critical dimension ranging from greater than about 20 Å to about 200 Å. The combined volume of the micropores and the mesopores preferably comprises about 70 percent or greater of the total pore volume, and more preferably, about 80 percent or greater of the total pore volume. The balance of the pore volume will comprise macropores, which have a pore diameter of greater than about 200 Å. Macropores include the void spaces between particles or crystallites.

The pore diameter (or critical dimension), pore size distribution, and surface area of the porous titanosilicate can be obtained from the measurement of adsorption isotherms and pore volume. Typically, the measurements are made on the titanosilicate in powder form using as an adsorbate nitrogen at 77 K or argon at 88 K and using any suitable adsorption analyzer, such as a Micromeritics ASAP 2000 instrument. Measurement of micropore volume is derived from the adsorption volume of pores having a diameter in the range from about 4 Å to about 20 Å. Likewise, measurement of mesopore volume is derived from the adsorption volume of pores having a diameter in the range from greater than about 20 Å to about 200 Å. From the shape of the adsorption isotherm, a qualitative identification of the type of porosity, for example, microporous or macroporous, can be made. Additionally, increased porosity can be correlated with increased surface area. Pore diameter (or critical dimension) can be calculated from the data using equations described by Charles N. Satterfield in *Heterogeneous Catalysis in Practice*, McGraw-Hill Book Company, New York, 1980, pp. 106–114, incorporated herein by reference.

Additionally, crystalline porous titanosilicates can be identified by X-ray diffraction methods (XRD), either by comparing the XRD pattern of the material of interest with a previously published standard or by analyzing the XRD pattern of a single crystal to determine framework structure, and if pores are present, the pore geometry and pore size.

Non-limiting examples of porous titanosilicates which are suitably employed in the process of this invention include porous amorphous titanosilicates; porous layered titanosilicates; crystalline microporous titanosilicates, such as titanium silicalite-1 (TS-1), titanium silicalite-2 (TS-2), titanosilicate beta (Ti-beta), titanosilicate ZSM-12 (Ti-ZSM12) and titanosilicate ZSM-48 (Ti-ZSM-48); as well as mesoporous titanosilicates, such as Ti-MCM-41.

The pore structure of TS-1 comprises two interconnecting, roughly cylindrical, 10-ring pores of about 5 Å diameter. A 10-ring pore is formed from a total of ten tetrahedra ($SiO_4^{4-}$ and $TiO_4^{4-}$). Titanium silicalite and its characteristic XRD pattern have been reported in U.S. Pat. No. 4,410,501, incorporated herein by reference. TS-1 can be obtained commercially, but it can also be synthesized following the methods described in U.S. Pat. No. 4,410,501. Other preparations have been reported by the following (incorporated herein by reference): A. Tuel, *Zeolites*, 1996, 16, pp. 108–117; by S. Gontier and A. Tuel, *Zeolites*, 1996, 16, pp. 184–195; by A. Tuel and Y. Ben Taarit in *Zeolites*, 1993, 13, pp. 357–364; by A. Tuel, Y. Ben Taarit and C. Naccache in *Zeolites*, 1993, 13, pp. 454–461; by A. Tuel and Y. Ben Taarit in *Zeolites*, 1994, 14, pp. 272–281; and by A. Tuel and Y. Ben Taarit in *Microporous Materials*, 1993, 1, pp. 179–189.

The pore structure of TS-2 comprises one three-dimensional, 10-ring microporous system. TS-2 can be synthesized by the methods described in the following references (incorporated herein by reference): J. Sudhakar Reddy and R. Kumar, *Zeolites*, 1992, 12, pp. 95–100; by J. Sudhakar Reddy and R. Kumar, *Journal of Catalysis*, 1991, 130, pp. 440–446; and by A. Tuel and Y. Ben Taarit, *Applied Catal. A, General*, 1993, 102, pp. 69–77.

The pore structure of Ti-beta comprises two interconnecting 12-ring, roughly cylindrical pores of about 7 Å diameter. The structure and preparation of titanosilicate beta have been described in the following references, incorporated herein by reference: PCT patent publication WO 94/02245

(1994); M. A. Camblor, A. Corma, and J. H. Perez-Pariente, *Zeolites*, 1993, 13, pp. 82–87; and M. S. Rigutto, R. de Ruiter, J. P. M. Niederer, and H. van Bekkum, *Stud. Surf. Sci. Cat.*, 1994, 84, pp. 2245–2251.

The pore structure of Ti-ZSM-12 comprises one, one-dimensional 12-ring channel system of dimensions 5.6×7.7 Å, as referenced by S. Gontier and A. Tuel, ibid., incorporated herein by reference.

The pore structure of Ti-ZSM-48 comprises a one-dimensional 10-ring channel system of dimensions 5.3 Å by 5.6 Å, as referenced by R. Szostak, *Handbook of Molecular Sieves*, Chapman & Hall, New York, 1992, pp. 551–553. Other references to the preparation and properties of Ti-ZSM-48 include C. B. Dartt, C. B. Khouw, H. X. Li, and M. E. Davis, *Microporous Materials*, 1994, 2, pp. 425–437; and A. Tuel and Y. Ben Taarit, *Zeolites*, 1996, 15, pp. 164–170. The aforementioned references are incorporated herein by reference.

Ti-MCM-41 is a hexagonal phase isomorphous to the aluminosilicate MCM-41. The channels in MCM-41 are one-dimensional with diameters ranging from about 28 Å to 100 Å. Ti-MCM-41 can be prepared as described in the following citations incorporated herein by reference: S. Gontier and A. Tuel, *Zeolites*, 1996, 15, pp. 601–610; and M. D. Alba, Z. Luan, and J. Klinowski, *J. Phys. Chem.*, 1996, 100, pp. 2178–2182.

The silicon to titanium atomic ratio (Si:Ti) of the titanosilicate can be any ratio which provides for an active and selective epoxidation catalyst in the hydro-oxidation process described herein. A generally advantageous Si:Ti atomic ratio is equal to or greater than about 5:1, preferably, equal to or greater than about 10:1. A generally advantageous Si:Ti atomic ratio is equal to or less than about 200:1, preferably, equal to or less than about 100:1. It is noted that the Si:Ti atomic ratio defined herein refers to a bulk ratio.

d. Titanium Dispersed on Silica

Another suitable support for the catalyst of this invention comprises titanium dispersed on silica, a variety of which supports can be obtained commercially. Alternatively, this type of support can be prepared by the method described in PCT patent publication WO 98/00415, incorporated herein by reference. In the latter reference, the titanium ions are dispersed over the surface of the silica substantially in a disorganized phase. The term "substantially" means that greater than about 80 weight percent of the titanium exists in the disorganized phase. Preferably, greater than about 85, even more preferably, greater than about 90, and most preferably, greater than about 95 weight percent of the titanium exists in the disorganized phase. This result implies that typically less than about 20, preferably, less than about 15, even more preferably, less than about 10, and most preferably, less than about 5 weight percent of the titanium in the support exists in an organized crystalline form, specifically crystalline titanium dioxide. Thus, in its typical form, the support is substantially free of crystalline titanium dioxide, and in its most preferred form, essentially free of crystalline titanium dioxide. High resolution transmission electron microscopy (HR-TEM) and Energy Dispersive X-ray analysis (EDX) can be used to image the gold and titanium in the catalyst.

The disorganized titanium phase can be distinguished from bulk crystalline titanium dioxide by HR-TEM and/or by Raman spectroscopy. Additionally, the disorganized phase does not exhibit a distinct X-ray diffraction (XRD) pattern. However, XRD is less sensitive in detecting crystalline titanium dioxide. Accordingly, the absence of an XRD pattern characteristic of the bulk crystalline phases of titanium dioxide is not conclusive evidence that these phases are absent in the support. Ultraviolet-Visible Diffuse Reflectance Spectroscopy (UV-VIS DRS) provides a third analytical technique which can distinguish between the disorganized titanium phase and crystalline titanium dioxide. Typically, any one of HR-TEM, Raman, or UV-VIS DRS can be used to identify the disorganized phase. Additionally, titanium K-edge X-Ray Absorption Near Edge Structure (XANES) spectroscopy can be used in a complementary manner with HR-TEM, Raman and/or UV-VIS DRS to identify the disorganized phase. These methods are described in WO 98/00415.

The titanium loading on the silica can be any which gives rise to an active catalyst in the process of this invention. Typically, the titanium loading is greater than about 0.02 weight percent, preferably, greater than about 0.1 weight percent, based on the weight of the silica. Typically, the titanium loading is less than about 20 weight percent, and preferably less than about 10 weight percent, based on the weight of the silica.

e. Titanium Dispersed on Promoter Metal Silicates

Yet another suitable support for the catalyst of this invention comprises titanium dispersed on promoter metal silicates. Stoichiometric and non-stoichiometric compounds comprising promoter metal silicates can be used. Any amorphous or crystalline promoter metal silicate is suitably employed. Preferred promoter metal silicates include the silicates of Group 1, Group 2, the lanthanide rare earths, and the actinide metals, and combinations thereof. Non-limiting examples of preferred promoter metal silicates include magnesium silicate, calcium silicate, barium silicate, erbium silicate, and lutetium silicate. The titanium can be dispersed on the promoter metal silicate in a manner analogous to that described in section (d) hereinabove. Analytical methods such as those described in section (d) hereinabove can be used to identify the dispersed titanium phase.

f. Mixtures of Supports

Any combination or mixture of the supports a–e, described hereinabove, can be employed in the catalyst of this invention.

When the reducing agent provides the source of titanium, then any heterogeneous catalyst support can be used in the process of this invention including those which contain titanium and those which do not. Heterogeneous catalyst supports are well known to those skilled in the art. Suitable non-limiting examples include silicas, aluminas, metallosilicates, such as aluminosilicates, magnesia, carbon, zirconia, titania, and mixtures thereof. When the reducing agent provides the source of titanium, then preferably, the catalyst support is silica.

Optionally, the catalyst of this invention can contain at least one promoter metal. Any metal or metal ion which enhances the performance of the catalyst in the oxidation process of this invention can be employed as a promoter metal. Factors contributing to improved performance include, for example, increased conversion of the compound to be oxidized, increased selectivity to the desired oxidation product, decreased production of co-products, such as water, and increased catalyst lifetime. Non-limiting examples of suitable promoter metals include the metals of Groups 1 through 12 of the Periodic Table of the Elements, as well as the rare earth lanthanides and actinides, as referenced in the *CRC Handbook of Chemistry and Physics*, 75$^{th}$ ed., CRC Press, 1994. Preferably, the promoter metal is selected from silver, the Group 1 metals of the Periodic Table including lithium, sodium, potassium, rubidium, and cesium; the Group 2 metals, including beryllium, magnesium, calcium, strontium, and barium; the lanthanide rare earth metals, including cerium, praseodymium, neodymium, promethium, samarium, europium, gadolinium, terbium, dysprosium, holmium, erbium, thulium, ytterbium, and lutetium; and the actinide metals, specifically, thorium and uranium. More preferably, the promoter metal is silver, magnesium, calcium, barium, erbium, lutetium, sodium, lithium, potassium, rubidium, cesium, or a combination thereof. Typically, the oxidation state of the promoter metal ranges from +1 to +7, but metallic species may also be present. Silver can be present as a +1 ion, as elemental metal, or as an alloy with gold.

The total quantity of promoter metal(s) deposited on the support typically is greater than about 0.01, preferably, greater than about 0.10, and more preferably, greater than about 0.15 weight percent, based on the total weight of the catalyst. The total quantity of promoter metal(s) deposited on the support is generally less than about 20, preferably, less than about 15, and more preferably, less than about 10 weight percent, based on the total weight of the catalyst. Those skilled in the art will recognize that when a promoter metal titanate or silicate is employed, the weight percentage of promoter metal may be much higher, for example, as high as about 80 weight percent. In a preferred embodiment, if the promoter metal is a Group 8 metal, such as a platinum group metal, then the total concentration of the Group 8 metal(s) is less than about 0.01 weight percent of the total catalyst composition.

The promoter metal is impregnated onto the catalyst support from an aqueous or organic solution containing a soluble promoter metal salt. Any salt of the promoter metal with adequate solubility can be used including, for example, the promoter metal nitrates, halides, carbonates, borates, and carboxylates including, for example, acetates, oxylates, lactates, citrates, maleates, and cinnamates, and mixtures thereof. Water is the preferred solvent, but organic solvents, such as alcohols, esters, ketones, and aliphatic and aromatic hydrocarbons, can also be used. Typically, the molarity of the soluble promoter metal salt in the impregnation solution ranges from about 0.001 M to the saturation point, preferably, from about 0.005 M to about 0.5 M.

The impregnations of the gold compound, the reducing agent, and the optional promoter metal(s) onto the support can be conducted in any order which yields the catalyst of the invention. For example, the gold compound can be impregnated onto the titanium-containing support first, followed by the reducing agent; or the order can be reversed with the reducing agent being impregnated first and then the gold compound. When the support contains titanium and the reducing agent does not, it is preferable to impregnate the reducing agent onto the titanium-containing support prior to the gold compound. When the support does not contain titanium and the reducing agent does, then preferably, the gold compound is deposited before the titanium-containing reducing agent. This latter preferred embodiment yields a catalyst which efficiently utilizes hydrogen in the hydro-oxidation process, as evidenced by the low water to olefin oxide molar ratio achieved. The promoter metal compound or compounds can be impregnated before, after, or simultaneously with the impregnation of the gold compound and/or the reducing agent. In a preferred embodiment, the promoter metal compound is deposited simultaneously with the gold compound and reducing agent. This preferred embodiment also leads to high hydrogen efficiency in the hydro-oxidation process, as evidenced by a low water to propylene oxide molar ratio. After each impregnation, the wetted support is typically dried under air or, if necessary, under an inert atmosphere, such as nitrogen or helium, or under a vacuum to remove solvent. Drying is effected at a temperature between about ambient, taken as 21° C., and about 150° C.

After the final impregnation and drying, optionally the support may be washed. The washing step typically involves immersing the impregnated support in a solvent and stirring the suspension at ambient temperature under air for a period of time ranging from about 30 minutes up to about 10 hours. Any solvent which can dissolve excess reducing agent and/or any undesirable ions known to be present provides an acceptable wash liquid. Water is the preferred solvent, but organic solvents may also be employed. Generally, from about 10 ml wash liquid up to about 200 ml wash liquid are used per gram of impregnated support. The washing step can be carried out once or repeated as desired.

Following the optional washing step, the impregnated support may be optionally treated with a solution of one or more promoter metal ions. This step functions to replenish desirable promoter metal ions which may have been lost during the preceding washing. The treatment simply involves immersing the impregnated support in a solution containing the desirable promoter metal ions. The molarity of the solution can range from about 0.001 M to the saturation point of the promoter metal compound used, preferably, from about 0.005 M to about 0.5 M.

As a final optional step, the impregnated support may be heated prior to use. The optional heating may be conducted under oxygen or an oxygen-containing gas, such as air, or under an inert atmosphere, such as nitrogen, or under a reducing atmosphere, such as hydrogen. The optional heating is typically conducted at a temperature between about 100° C. and about 800° C., preferably between about 120° C. and about 750° C. Alternatively, the impregnated catalyst may be conditioned in the oxidation reactor under an atmosphere comprising an inert gas, such as helium, and optionally, one or more compounds selected from hydrocarbons, for example, the olefin to be oxidized, hydrogen, and oxygen, at a temperature between about ambient, taken as 21° C., and about 600° C.

The aforementioned catalyst is useful in hydro-oxidation processes similar to those described in PCT patent publications WO 98/00413, WO 98/00414, and WO 98/00415, incorporated herein by reference. In these processes, an olefin is contacted with oxygen in the presence of hydrogen, the gold-titanium catalyst, and optionally a diluent, to yield the corresponding olefin oxide. Any olefin containing three or more carbon atoms can be employed, including monoolefins, diolefins, and olefins substituted with various organic moieties. Preferred olefins include $C_{3-12}$ olefins. More preferred are $C_{3-8}$ olefins, and most preferred is propylene. Typically, the quantity of olefin in the feedstream is greater than about 1, preferably, greater than about 10, and more preferably, greater than about 20 mole percent, based on the total moles of olefin, oxygen, hydrogen, and optional diluent. Typically, the quantity of olefin is less than about 99, preferably, less than about 85, and more preferably, less than about 70 mole percent, based on the total moles of olefin, oxygen, hydrogen, and optional diluent. Preferably, the quantity of oxygen in the feedstream is greater than about 0.01, more preferably, greater than about 1, and most preferably greater than about 5 mole percent, based on the total moles of olefin, hydrogen, oxygen, and optional diluent. Preferably, the quantity of oxygen is less than about 30, more preferably, less than about 25, and most preferably less than about 20 mole percent, based on the total moles of olefin, hydrogen, oxygen, and optional diluent. Suitable quantities of hydrogen in the feedstream are typically greater than about 0.01, preferably, greater than about 0.1, and more preferably, greater than about 3 mole percent, based on the total moles of olefin, hydrogen, oxygen, and optional diluent. Suitable quantities of hydrogen are typically less than about 50, preferably, less than about 30, and more preferably, less than about 20 mole percent, based on the total moles of olefin, hydrogen, oxygen, and optional diluent.

The diluent can be any gas or liquid which does not inhibit the process of this invention. In a gas phase process, suitable gaseous diluents include, but are not limited to, helium, nitrogen, argon, methane, carbon dioxide, steam, and mixtures thereof. If a liquid phase process, the diluent can be any oxidation stable and thermally stable liquid. Suitable liquid diluents include chlorinated aromatics, preferably chlorinated benzenes, such as chlorobenzene and dichlorobenzene; chlorinated aliphatic alcohols, preferably $C_{1-10}$ chlorinated alkanols, such as chloropropanol; as well as liquid polyethers, polyesters, and polyalcohols. If a gaseous diluent is used, the amount of diluent in the feedstream is typically greater than about 0, preferably greater than about 0.1, and more preferably, greater than about 15 mole percent, based on the total moles of olefin, oxygen, hydrogen, and diluent. The amount of gaseous diluent is typically less than about 90, preferably, less than about 80, and more preferably, less than about 70 mole percent, based on the total moles of olefin, oxygen, hydrogen, and diluent. If a liquid diluent is used, then the amount of diluent in the feedstream is typically greater than about 0, preferably greater than about 5 weight percent, based on the combined weight of the olefin and diluent. The amount of liquid diluent is typically less than about 99, preferably, less than about 95 weight percent, based on the combined weight of the olefin and diluent.

The hydro-oxidation process can be conducted in a reactor of any conventional design suitable for gas or liquid phase processes. Usually, the process is conducted at a temperature which is greater than about ambient, taken as 21° C., and less than about 250° C. Since catalysts prepared by the preferred methods of this invention advantageously produce lower amounts of water than similar catalysts prepared by prior art methods, the hydro-oxidation process employing the catalyst of this invention can be conducted at temperatures higher than usual. Preferably, the temperature is greater than about 70° C., more preferably, greater than about 120° C. Usually, the temperature is less than about 250° C., preferably less than about 225° C. Operation at higher temperatures provides steam credits from the heat produced. Accordingly, the hydro-oxidation process can be integrated into a total plant design wherein the heat derived from the steam is used to drive additional processes, such as, the separation of the olefin oxide from water.

Preferably, the pressure of the hydro-oxidation process ranges from about atmospheric to about 400 psig (2758 kPa), more preferably, from about 150 psig (1034 kPa) to about 250 psig (1724 kPa). For a gas phase process the gas hourly space velocity (GHSV) of the olefin can vary over a wide range, but typically is greater than about 10 ml olefin per ml catalyst per hour ($h^{-1}$), preferably greater than about 100 $h^{-1}$, and more preferably, greater than about 1,000 $h^{-1}$. Typically, the GHSV of the olefin is less than about 50,000 $h^{-1}$, preferably, less than about 35,000 $h^{-1}$, and more preferably, less than about 20,000 $h^{-1}$. The gas hourly space velocities of the oxygen, hydrogen, and diluent components can be determined from the space velocity of the olefin taking into account the relative molar ratios desired.

Typically, an olefin conversion is achieved which is greater than about 0.1 mole percent, preferably, greater than about 0.3 mole percent, and more preferably, greater than about 0.4 mole percent. The term "olefin conversion" is defined as the mole percentage of olefin in the feedstream which reacts to form products. Typically, a selectivity to olefin oxide is achieved which is greater than about 60 mole percent, preferably, greater than about 70 mole percent, more preferably, greater than about 80 mole percent, and most preferably, greater than about 90 mole percent. The term "selectivity to olefin oxide" is defined as the mole percentage of reacted olefin which forms the olefin oxide product.

It is desirable to achieve a good hydrogen efficiency in the hydro-oxidation process. Hydrogen efficiency can be optimized by achieving a water to olefin oxide molar ratio as low as possible. In the process of this invention, the water to olefin oxide molar ratio is typically greater than about 2:1, but typically less than about 35:1. In preferred embodiments of this invention, the water to propylene oxide molar ratio is advantageously less than about 10:1, and more preferably, less than about 5:1.

When activity of the gold-titanium catalyst has decreased to an unacceptably low level, the catalyst can be easily regenerated. One regeneration method comprises heating the deactivated catalyst at a temperature between about 150° C. and about 500° C. in a regeneration gas containing any of hydrogen, oxygen, and/or water, and optionally an inert gas, at a temperature preferably between about 200° C. and about 400° C. Preferably, the hydrogen, oxygen, and/or water comprises from about 2 to about 100 mole percent of the regeneration gas. Suitable inert gases are non-reactive and include, for example, nitrogen, helium, and argon.

The invention will be further clarified by a consideration of the following examples, which are intended to be purely exemplary of the use of the invention. Other embodiments of the invention will be apparent to those skilled in the art from a consideration of this specification or practice of the invention as disclosed herein. Unless otherwise noted, all percentages are given on a mole percent basis.

EXAMPLE 1

Sodium chloroaurate (NaAuCl$_4$.x H$_2$O, 0.28 g) was dissolved in deionized water (42 ml). Silica spheres (2 mm dia., 30 nm pores, 27.41 g) were placed in a round-bottom flask (100 ml) and heated at 60° C. for 1 h under a vacuum (30 mm Hg) on a rotary evaporator. The silica was impregnated with the sodium chloroaurate solution by feeding the solution slowly into the flask at 60° C. under vacuum. The flask was evacuated until a dry solid was obtained. The dry solid was removed from the flask and air-dried at 60° C. for 12 h.

Titanyl acetylacetonate (0.27 g) was dissolved in methanol (22.5 ml). The gold treated silica spheres (9.0 g), prepared hereinabove, were placed in a round-bottom flask (50 ml) which was evacuated for 2 h on a rotary evaporator in a water bath at 80° C. The titanyl acetylacetonate solution was slowly added to the silica under vacuum at room temperature. The flask was returned to the water bath at 80° C. and rotated under vacuum for 3 h. The solids were removed from the flask, washed with methanol (55 ml), filtered, and dried at room temperature. The sample was placed in the oven and calcined in air using the following calcination scheme: heated from room temperature to 550° C. in 5 h, held at 550° C. for 3 h, and cooled to room temperature to yield a catalyst comprising gold on a titanium-containing support. Gold loading, 0.5 weight percent;

titanium loading 0.5 weight percent; Na:Au atomic ratio, 1:1, as determined by neutron activation analysis (NAA).

The catalyst prepared hereinabove was tested in the hydro-oxidation of propylene to propylene oxide. The catalyst (2 g) was loaded into a fixed-bed, continuous flow reactor (10 cm$^3$) with flows of helium, oxygen, hydrogen, and propylene. Feedstream composition was 10 percent hydrogen, 10 percent oxygen, and 20 percent propylene, the balance being helium. Propylene, oxygen and helium were used as pure streams; hydrogen was mixed with helium in a 20H$_2$/80 He (vol/vol) mixture. Total flow rate was 160 cm$^3$/min (olefin GHSV 480 h$^{-1}$). Pressure was atmospheric; process temperature was 160° C. Products were analyzed using an on-line gas chromatograph (Chrompack™ Poraplot™ S column, 25 m) with the results shown in Table 1.

TABLE 1

Hydro-oxidation of Propylene to Propylene Oxide

| Ex. | T (° C.) | PP Conv[a] (mole %) | PO Sel[a] (mole %) | H$_2$O/PO mole ratio | g PO per kg cat-h |
|---|---|---|---|---|---|
| 1[b] | | | | | |
| at start | 160 | 0.36 | 92 | 2.04/1 | 8.3 |
| at 24 h | 160 | 0.27 | — | 4.18/1 | — |
| 2[c] | 160 | 0.40 | 87 | — | 5.8 |
| " | 180 | 0.64 | 72 | — | 8.0 |
| 3[c] | 160 | 0.24 | 87 | — | 3.3 |
| " | 180 | 0.47 | 68 | — | 5.2 |
| 3[d] | 160 | 0.45 | 85 | — | 6.2 |
| 4[c] | 140 | 0.25 | 88 | — | 3.5 |
| " | 160 | 0.36 | 82 | — | 4.7 |
| " | 180 | 0.50 | 65 | — | 4.9 |

[a]PP = propylene; PO = propylene oxide
[b]Feedstream: 20% propylene, 10% hydrogen, 10% oxygen, balance helium. Catalyst, 2 g; Total flow rate 160 cm$^3$/min; olefin GHSV 480 h$^{-1}$; Pressure atmospheric.
[c]Feedstream: 19.8% propylene, 9.8% hydrogen, 10.1% oxygen, balance helium. Catalyst, 3 g; Total flow rate 160 cm$^3$/min; olefin GHSV 320 h$^{-1}$; Pressure atmospheric.
[d]After regeneration at 300° C. under hydrogen.

The impregnated catalyst of Example 1 produced at the initial time a propylene conversion of 0.36 percent and a propylene oxide selectivity of 92 percent at 160° C. The water to propylene oxide molar ratio was only 2.04:1. Propylene oxide productivity was calculated at 8.3 g PO:kg cat-h. After 24 h on stream, the conversion was 0.27 mole percent and the water to propylene oxide molar ratio was 4.18:1. The catalyst was regenerated at 450° C. in a flow of oxygen (20 percent in helium) without loss in activity.

EXAMPLE 2

A support comprising titanium dispersed on silica (2–4 mm spheres; surface area, 360 m$^2$/g; average pore diameter, 110 Å) was calcined to remove residual organics by the following scheme: from 80° C. to 300° C. in 4 h, held at 300° C. for 2 h, from 300° C. to 550° C. in 4 h, held at 550° C. for 2 h, then cooled to 80° C. and stored in closed vial at room temperature. The calcined spheres (12.16 g) were put into a round-bottom flask which was placed on a rotary evaporator and evacuated at room temperature for 1 h.

Sodium D-gluconate (Aldrich, 2.0760 g) was dissolved in doubly deionized water (18 ml). The gluconate solution was impregnated onto the spheres under vacuum with vigorous rotation on the rotary evaporator. The spheres were then dried as follows under vacuum on a waterbath: 60 min at room temperature, 30 min at 35° C., 30 min at 60° C., then cooled to room temperature.

Chloroauric acid (HAuCl$_4$.x H$_2$O, 0.3729 g) was dissolved in deionized water (18 ml). The gold solution was impregnated onto the spheres under vacuum and vigorous rotation on a rotary evaporator. The impregnated spheres were then dried using the following scheme: 60 min at room temperature, 30 min at 35° C., 30 min at 60° C., then cooled to room temperature. During the drying, the reduction of gold could be seen by a change in color from yellow to greenish-purple. The catalyst was then cooled to room temperature and dried overnight in an oven at 80° C. under a nitrogen atmosphere. During this period, the color of the catalyst turned completely purple.

The impregnated, dried spheres (4.72 g) were submerged in deionized water (50 ml) and left with occasional stirring for 30 min. The water was decanted, fresh water (50 ml) was added, and the mixture was left to stand for another 30 min. The water was decanted, fresh water (50 ml) was added for a third time, and the mixture was left to stand for an additional 30 min. In a final wash, an aqueous solution of sodium nitrate (0.9995 g in 50 ml water) was added, and the mixture was left standing for 30 min. Thereafter, the mixture was filtered and dried under nitrogen at 80° C. overnight. Next, the material was calcined in air using the following scheme to yield a catalyst of the invention: from 80 to 200° C. in 4 h, from 200° C. to 500° C. in 4 h, held at 500° C. for 2 h, then cooled to 80° C. and stored in a closed vial at room temperature. Gold loading, 1.32 weight percent; titanium loading, 1.98 weight percent; Na:Au atomic ratio 4.6:1, as determined by NAA.

The catalyst was tested in the hydro-oxidation of propylene to propylene oxide, in the manner described in Example 1, with the exception that 3 g catalyst were used and the feedstream comprised 19.8 percent propylene, 10.1 percent oxygen, and 9.8 percent hydrogen, the balance being helium. Results are set forth in Table 1. At 160° C. the impregnated catalyst of Example 2 produced a propylene conversion of 0.40 percent, a propylene oxide selectivity of 87 percent, and a productivity of 5.8 g PO/kg cat-h. No deactivation of the catalyst was found up to 15 h on stream. At 180° C. the propylene conversion was found to be 0.64 percent; propylene oxide selectivity was 72 percent; and productivity was 8.0 g PO/kg cat-h. The catalyst was regenerated at 300° C. under air. Regeneration under hydrogen was also effective.

EXAMPLE 3

A support comprising titanium dispersed on silica (2–4 mm spheres; surface area, 360 m$^2$/g; average pore diameter, 110 Å) was calcined using the following scheme: from 80° C. to 300° C. in 4 h, held at 300° C. for 2 h, then from 300° C. to 550° C. in 4 h, held at 550° C. for 2 h, then cooled to 80° C., and stored in a closed vial at room temperature. The calcined spheres (12.12 g) were placed on a rotary evaporator and evacuated at room temperature for 1 h.

Citric acid (Aldrich, 0.7181 g) and sodium chloride (Fischer, 0.1727 g) were dissolved in doubly deionized water (18 ml). The solution was impregnated onto the spheres on a rotary evaporator under vacuum and under vigorous rotation. The impregnated spheres were then dried under vacuum using the following heating scheme: 60 min at room temperature, 30 min at 35° C., 30 min at 60° C., then cooled to room temperature. Chloroauric acid (HAuCl$_4$.xH$_2$O, 0.2996 g) was dissolved in deionized water (18 ml). The gold solution was impregnated onto the spheres on a rotary evaporator under vacuum and vigorous rotation. The impregnated spheres were dried as noted in the previous step, after which the vacuum was released. The dried material was further dried under nitrogen at 80° C. overnight and then calcined in air using the following heating scheme: from 80° C. to 200° C. in 4 h, from 200° C. to 500° C. in 4 h, held at 500° C. for 2 h, then cooled to 80° C. and stored in a closed vial at room temperature to yield a catalyst of the invention. Gold loading, 1.08 weight percent; titanium loading, 2.7 weight percent; Na:Au atomic ratio 3.8:1, as determined by NAA.

The catalyst was tested in the hydro-oxidation of propylene to propylene oxide in the manner described in Example 2 with the results shown in Table 1. At 160° C. propylene conversion was 0.24 percent; propylene oxide selectivity was 87 percent; productivity was 3.3 g PO/kg cat-h. No deactivation was observed for 15 h on stream. At 180° C., the conversion was 0.47 percent, selectivity was 68 percent, and productivity was 5.2 g PO/kg cat-h. After regenerating the catalyst at 300° C. under hydrogen, the catalyst achieved a conversion of 0.45 percent, a selectivity of 85 percent, and a productivity of 6.2 g PO/kg cat-h at 160° C.

EXAMPLE 4

A support comprising titanium dispersed on silica (2–4 mm spheres, surface area, 360 m$^2$/g, average pore diameter, 110 Å) was calcined to remove residual organics by the following scheme: from 80° C. to 300° C. in 4 h; held at 300° C. for 2 h; from 300° C. to 550° C. in 4 h; held at 550° C. for 2 h; then cooled to 80° C., and stored in a closed vial at room temperature. The calcined support (25.23 g) was put into a round-bottom flask, which was placed on a rotary evaporator and evacuated at room temperature for 2 h. Potassium D-gluconate (Aldrich, 99 percent, 4.513 g) was dissolved in doubly deionized water (36 ml) resulting in a solution having a pH of 7.94. The gluconate solution was impregnated onto the support under vacuum with vigorous rotation on the rotary evaporator. The support was then dried in the rotary evaporator under vacuum using a waterbath as follows: 60 min at room temperature, 30 min at 35° C., and 30 min at 60° C., then cooled to room temperature.

Chloroauric acid (Alfa Aesar, 99.9 percent, 0.7583 g) was dissolved in doubly deionized water (36 ml) to yield a solution having a pH of 1.32. The gold solution was impregnated onto the gluconate-impregnated support under vacuum and with vigorous rotation on the rotary evaporator. The impregnated support was then dried using the following scheme: 90 min at room temperature, 30 min at 35° C., 30 min at 60° C., then cooled to room temperature. During the initial drying at room temperature, the support changed color from yellow to yellow green. At 60° C. some of the support particles turned purple. The dried material was subjected to a final drying overnight at 80° C. in an oven under a nitrogen atmosphere, yielding a purple-colored catalyst comprising gold on a support comprising titanium dispersed on silica.

The catalyst prepared hereinabove (13.14 g) was submerged in doubly deionized water (100 ml) to form a mixture at pH 4.14, which was left with occasional stirring for 70 min (pH 3.88). The water was decanted, and fresh water (100 ml) was added. The mixture was left standing for 1 h (pH 4.48). The water was decanted again; fresh water (100 ml) was added for a third time; and the mixture was left standing for an additional 60 min (pH 5.06). Thereafter, the mixture was filtered, and the resulting catalyst was dried under nitrogen at 80° C. overnight, then stored in a closed vial at room temperature. Catalyst composition: Au, 1.11 weight percent; Ti, 1.80 weight percent; K:Au atomic ratio, 2.4:1, as determined by NAA.

The catalyst (3 g) was tested in the hydro-oxidation of propylene to propylene oxide, in the manner described in Example 2 hereinabove. Process conditions and results are shown in Table 1. A propylene conversion between 0.25 and 0.36 percent and a propylene oxide selectivity of greater than 80 percent were achieved at a process temperature between 140° C. and 160° C. The catalyst was effectively regenerated under hydrogen at 300° C.

EXAMPLE 5

A 14 L stainless steel container with a cover was purged for 15 minutes with dry nitrogen. Tetra(ethyl)orthosilicate (11,276 g) was transferred into the container. Titanium butoxide (236.4 g) was added to the silicate with vigorous stirring. The resulting solution was heated to 91° C. with continuous agitation under the nitrogen purge, and kept at this temperature for a total heating time of 2 h. The solution was then cooled to 1.9° C. in an ice bath for 2 h. An aqueous solution of tetrapropylammonium hydroxide (9874 g, 40 weight percent TPAOH) having a low alkali content (less than 20 ppm Na) was placed into a 16 gallon polypropylene container. Deionized water (5814 g) was added to the TPAOH solution with stirring. The container was placed into an ice bath. The TPAOH solution was also pumped through an external stainless steel ¼ inch (0.6 cm) coil emerged into a dry ice—acetone bath (t approximately −25° C.) to achieve faster cooling and better temperature control. The solution was cooled down to −4° C. The cold alkoxide solution was pumped into the 16 gallon container at the rate of 150 ml/min. The temperature of the mixture slowly rose reaching −2° C. after the addition of about one-half of the alkoxide solution. Finally, de-ionized water (5432 g) was added to the mixture with agitation. The temperature of the final mixture was 8.2° C. The mixture was stirred for 18 h at room temperature. Thereafter, the hydrothermal synthesis was conducted in a stainless steel autoclave with 200 rpm stirring. The autoclave was heated to 160° C. and kept at this temperature for 4 days. The reactor was then cooled to room temperature, and the product was pumped out from the reactor. The product contained a large organic layer that was separated from the rest of the mixture. The pH of the aqueous milky liquid was adjusted to about 8.7 with nitric acid (1.5N), and the product was recovered by centrifugation at 3000 rpm. The solid was re-dispersed in deionized water and centrifuged again. The resulting solid was dried at 110° C. for 12 h, followed by calcination in an air-blown oven. The material was heated to 550° C. in 5 h, followed 5 h heating at 550° C. A powder X-ray diffraction analysis showed that the material was a pure titanosilicate phase of the MFI structure type.

The titanium-containing support (30 g) prepared above was calcined in air at 575° C. for 8 h and cooled to room temperature. A solution was prepared comprising chloroauric acid (0.035 g) and sodium acetate (0.5 g) in methanol (35 g). The sample was dried under vacuum at room temperature until free flowing, then heated under vacuum to 100° C. for 2 h to yield a catalyst of this invention.

The catalyst (30 g) was evaluated in the hydro-oxidation of propylene to propylene oxide in the manner described in Example 1, with the exception that the total flow was 15.0 L/min; the pressure was 210 psig (1448 kPa); and the shell temperature of the reactor was 160° C. At the start, the catalyst was heated at 140° C. for 5 h under helium; then propylene and hydrogen were introduced for 10 min; then oxygen was added to the flow. After propylene oxide was produced at a steady rate for 1 h, the temperature was ramped in 15° C. intervals to the operating temperature of 160° C. A propylene conversion of 3.2 percent was obtained with a selectivity to propylene oxide of 96 percent and a water/PO molar ratio of 5.2.

EXAMPLE 6

A crystalline titanium silicate (15 g), prepared as in Example 5, was calcined in air to 600° C. for 8 h and cooled to room temperature. A methanol solution containing sodium acetate (0.20 g in 25 g methanol) was prepared, and to this solution was added a second methanol solution containing chloroauric acid (0.06 g in 5 g methanol). The resulting solution was used to impregnate the titanium silicate by incipient wetness. The impregnated silicate was thereafter dried in a vacuum oven for 30 min and then heated in the oven at 60° C. for 1 h to yield a catalyst comprising gold on a titanium-containing support. Some gold particles could be seen under high resolution transmission electron microscopy. Mie scattering showed a weak band for metallic gold. As determined by X-ray photoelectron spectroscopy, 60 weight percent of the total gold content was metallic gold.

The catalyst (3.0 g) was evaluated in the hydro-oxidation of propylene to propylene oxide in the manner similar to that of Example 5. The feedstream comprised propylene (35 percent), hydrogen (10 percent), oxygen (10 percent), the balance being helium. Process conditions were: 225 psig (1551 kPa) at a total flow of 1,500 standard cubic centimeters per minute (sccm). At a temperature of 170° C. the propylene conversion was 1.5 percent with a selectivity to propylene oxide of 99 percent and a water/PO molar ratio of 3.2.

What is claimed is:

1. A process of preparing a hydro-oxidation catalyst composition comprising gold on a titanium-containing support, the catalyst composition being capable of oxidizing an olefin with oxygen in the presence of hydrogen to form an olefin oxide, the preparation process comprising impregnating a gold compound and impregnating a reducing agent onto a catalyst support, wherein the catalyst support is selected from the group consisting of titanosilicates and titanium dispersed on silica; and wherein the reducing agent is an organic compound that does not contain titanium; and wherein the molar ratio of reducing agent to gold is greater than 0.5:1; the impregnation being conducted under conditions sufficient to prepare the hydro-oxidation catalyst composition.

2. The process of claim 1 wherein the gold compound is selected from the group consisting of chloroauric acid, sodium chloroaurate, potassium chloroaurate, gold cyanide, potassium gold cyanide, diethylamine auric acid trichloride, gold acetate, alkyl gold halides, and alkali aurates.

3. The process of claim 1 wherein the process is conducted at a gold loading of greater than about 10 parts per million by weight based on the total weight of the gold and support.

4. The process of claim 1 wherein the reducing agent is selected from the group consisting of sugars, carboxylic acids and salts thereof, alcohols and alkoxide salts thereof, alkanolamines, alkylamines, and mixtures thereof.

5. The process of claim 1 wherein the reducing agent is selected from the group consisting of $C_{6-20}$ sugars, $C_{2-20}$ carboxylic acids, $C_{1-15}$ aliphatic alcohols, $C_{1-15}$ alkylamines, the alkali and alkaline earth salts of the aforementioned sugars, carboxylic acids, and alcohols, and mixtures of any of the aforementioned compounds.

6. The process of claim 1 wherein the reducing agent is selected from the group consisting of methanol, ethanol, isopropanol, ethanolamine, acetic acid, lactic acid, citric acid, maleic acid, cinnamic acid, sodium acetate, sodium lactate, sodium citrate, sodium cinnamate, sodium maleate, and mixtures thereof.

7. The process of claim 1 wherein the molar ratio of reducing agent to gold is greater than about 1:1.

8. The process of claim 1 wherein the reducing agent is deposited onto the support prior to or simultaneous with deposition of the gold compound.

9. The process of claim 1 wherein the process is conducted at a titanium loading on the support of greater than about 0.02 and less than about 20 weight percent, based on the weight of the support.

10. The process of claim 1 wherein at least one promoter metal compound is impregnated onto the support.

11. The process of claim 10 wherein the promoter metal is selected from the group consisting of silver, Group 1, Group 2, the lanthanide rare earth metals, the actinide metals of the Periodic Table, and mixtures thereof.

12. The process of claim 10 wherein the promoter metal (s) is employed in a total concentration ranging from greater than about 0.01 to less than about 20 weight percent, based on the total weight of the catalyst.

13. The process of claim 1 wherein a solvent for the impregnation is selected from the group consisting of water, organic solvents, and mixtures thereof.

14. The process of claim 1 wherein after impregnation, the support is washed; and wherein after washing, optionally, the support is treated with a solution containing at least one promoter metal.

15. The process of claim 1 wherein the impregnation is conducted to the point of incipient wetness or a point of lesser wetness.

16. The process of claim 1 wherein the impregnation is conducted at a temperature between about 21° C. and about 100° C.

17. The process of claim 1 wherein after impregnation and any optional steps of washing and treating with a promoter metal, the catalyst is heated at a temperature greater than about 250° C. and less than about 800° C. in oxygen or an oxygen-containing gas, or heated in an inert atmosphere, or heated in a reducing atmosphere.

18. The process of claim 1 wherein the olefin is propylene.

* * * * *